United States Patent
Kalos et al.

(10) Patent No.: US 10,613,934 B2
(45) Date of Patent: **\*Apr. 7, 2020**

(54) MANAGING RAID PARITY STRIPE CONTENTION

(71) Applicant: INTERNATIONAL BUSINESS MACHINES CORPORATION, Armonk, NY (US)

(72) Inventors: Matthew J. Kalos, Tucson, AZ (US); Karl A. Nielsen, Tucson, AZ (US); Richard B. Stelmach, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/826,980

(22) Filed: Nov. 30, 2017

(65) Prior Publication Data

US 2018/0081760 A1 Mar. 22, 2018

Related U.S. Application Data

(63) Continuation of application No. 14/286,455, filed on May 23, 2014, now Pat. No. 9,891,993.

(51) Int. Cl.
*G06F 11/00* (2006.01)
*G06F 11/10* (2006.01)
*G06F 11/07* (2006.01)

(52) U.S. Cl.
CPC ...... *G06F 11/1076* (2013.01); *G06F 11/0727* (2013.01)

(58) Field of Classification Search
CPC .................................................. G06F 11/1076
See application file for complete search history.

(56) References Cited

U.S. PATENT DOCUMENTS

| 5,530,948 A | 6/1996 | Rezaul |
| 5,619,723 A | 4/1997 | Jones |

(Continued)

FOREIGN PATENT DOCUMENTS

| EP | 001016967 A2 | 7/2000 |
| EP | 001452967 A2 | 9/2004 |

(Continued)

OTHER PUBLICATIONS

Kenchammana-Hosekote et al., "REO: A generic RAID Engine and Optimizer," FAST '07: 5th USENIX Conference on File and USENIX Association Storage Technologies (16 pages).

(Continued)

*Primary Examiner* — Marc Duncan
*Assistant Examiner* — Jonathan D Gibson
(74) *Attorney, Agent, or Firm* — Griffiths & Seaton PLLC (57) ABSTRACT

For managing RAID parity stripe contention using a processor device in a computing environment, delaying, by a host being separate to the RAID, one of a plurality of operations overlapping a parity sector in a parity stripe with a currently running operation and serializing each one of the multiplicity of operations overlapping the parity sector. The host further serializes each one of the plurality of operations overlapping the parity sector. The delaying is performed when the host determines whether a new write written through a hardware performance path comprising the one of the plurality of operations will overlap the parity stripe of a previous write comprising the currently running operation at the RAID controller.

20 Claims, 5 Drawing Sheets

(56) References Cited

U.S. PATENT DOCUMENTS

| | | | |
|---|---|---|---|
| 5,742,752 A | 4/1998 | Dekoning | |
| 5,802,345 A | 9/1998 | Matsunami et al. | |
| 6,151,641 A | 11/2000 | Herbert | |
| 6,151,659 A * | 11/2000 | Solomon | G06F 3/0622 710/200 |
| 8,130,554 B1 * | 3/2012 | Linnell | G11C 16/22 365/185.28 |
| 9,092,364 B2 * | 7/2015 | Galbraith | G06F 11/1076 |
| 9,891,993 B2 * | 2/2018 | Kalos | G06F 11/1076 |
| 2009/0063899 A1 * | 3/2009 | Jordan | G06F 11/10 714/17 |
| 2009/0119567 A1 * | 5/2009 | Kawabata | G06F 11/1032 714/763 |
| 2009/0235023 A1 | 9/2009 | Manoj | |
| 2012/0226853 A1 | 9/2012 | Bert | |
| 2012/0297133 A1 * | 11/2012 | Sundrani | G06F 11/1076 711/113 |
| 2013/0097367 A1 | 4/2013 | Flynn et al. | |
| 2013/0275656 A1 | 10/2013 | Talagala et al. | |
| 2014/0101479 A1 * | 4/2014 | Galbraith | G06F 11/1076 714/6.2 |
| 2014/0189212 A1 * | 7/2014 | Slaight | G06F 12/0866 711/103 |
| 2015/0339194 A1 * | 11/2015 | Kalos | G06F 11/1076 714/6.24 |
| 2018/0081760 A1 * | 3/2018 | Kalos | G06F 11/1076 |

FOREIGN PATENT DOCUMENTS

| | | |
|---|---|---|
| EP | 1909163 A2 | 4/2008 |
| WO | 02071230 A1 | 9/2002 |

OTHER PUBLICATIONS

Amiri et al., "Scalable Concurrency Control and Recovery for Shared Storage Arrays (CMU-CS-99-111)," Parallel Data Laboratory, Paper 136, http://repository.cmu.edu/pdl/136, Feb. 1, 1999 (27 pages).

"Standard RAID levels," Wikipedia, Retrieved Apr. 6, 2012 (7 pages).

"Tagged Command Queuing," Wikipedia, Jul. 16, 2013 (3 pages).

* cited by examiner

MANAGING RAID PARITY STRIPE CONTENTION

CROSS-REFERENCE TO RELATED APPLICATIONS

This Application is a Continuation of U.S. patent application Ser. No. 14/286,455, filed May 23, 2014, the contents of which are hereby incorporated by reference.

BACKGROUND OF THE INVENTION

Field of the Invention

The present invention relates in general to computers, and more particularly to managing RAID parity stripe contention in a computing environment.

Description of the Related Art

In today's society, computer systems are commonplace. Computer systems may be found in the workplace, at home, or at school. A data processing system typically includes a processor subsystem having at least one central processing unit (CPU), an input/output (I/O) subsystem, a memory subsystem and a bus subsystem. The memory subsystem of the data processing system typically includes a data storage system having a controller connected to a back end storage. The controller controls the flow of data between the data processing system and the back end storage. The controller includes a cache memory that is typically implemented by static memories. During operation, the cache memory serves as a temporary store for data associated with a write I/O request.

These data processing systems may include data storage systems, or disk storage systems, to process and store data. Large amounts of data have to be processed daily and the current trend suggests that these amounts will continue being ever-increasing in the foreseeable future. For the most part, computing systems face a significant challenge to meet the increasingly stringent reliability demands and failure tolerances imposed by many software applications. In particular, responses to I/O requests in such data storage systems can be poorly defined in the wake of a failure that disrupts the processing of I/O requests. Accordingly, it would be desirable to improve the failure tolerance of data storage systems without compromising reliability and data availability.

SUMMARY OF THE DESCRIBED EMBODIMENTS

In one embodiment, a method is provided for managing RAID parity stripe contention, in a computing environment. In one embodiment, by way of example only, the method delays, by a host being separate to the RAID, one of a plurality of operations sent to a RAID controller having an overlapping of a parity sector in a parity stripe with a currently running operation and serializes, by the host, each one of the plurality of operations overlapping the parity sector; wherein the delaying further includes the host determining whether a new write written through a hardware performance path comprising the one of the plurality of operations will overlap the parity stripe of a previous write comprising the currently running operation at the RAID controller, and wherein the hardware performance path comprises a hardware optimization mode for handling write operations and updates controlled by the RAID controller.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned above, large amounts of data have to be processed daily and the current trend suggests that these amounts will continue being ever-increasing in the foreseeable future. As the performance of microprocessor and semiconductor memory technology increases, many computing systems use a redundant arrays of inexpensive disks (RAID) for significantly improving data transfer rate and data I/O rate over a comparable single disk access, but also provide error correction redundancy and lower cost.

RAID systems are disk array storage systems designed to provide large amounts of data storage capacity, data redundancy for reliability, and fast access to stored data. RAID storage uses multiple disks in order to provide fault tolerance, to improve overall performance, and to increase storage capacity in a system. With RAID technology, data can be mirrored on one or more other disks in the same array, so that if one disk fails, the data is preserved. RAID provides data redundancy to recover data from a failed disk drive and thereby improve reliability of the array. Although the disk array includes a multiplicity of disks, to the user the disk array is mapped by RAID management techniques within the storage subsystem to appear as one large, fast, reliable disk. There are several different methods to implement RAID.

RAID devices use many different architectures, depending on the desired balance between performance and fault tolerance. These architectures are called "levels." Standard RAID levels include the following: Level 0 (striped disk array without fault tolerance), Level 1 (mirroring and duplexing), Level 2 (error-correcting coding), Level 3 (bit-interleaved parity), Level 4 (dedicated parity drive), Level 5 (block interleaved distributed parity), Level 6 (independent data disks with double parity) and Level 10 (a stripe of mirrors). Some devices use more than one level in a hybrid or nested arrangement, and some vendors also offer non-standard proprietary RAID levels. RAID level 1 mirrors the stored data on two or more disks to assure reliable recovery of the data. RAID levels 3, 4, and 5 distribute data across the disks in the array and provide for a block (or multiple blocks) of redundancy information (e.g., parity) that is also distributed over the disk drives. On each disk, data is mapped and stored in predefined blocks generally having fixed size. A predefined number of blocks of data and redundancy information (e.g., parity), from each disk of the array, are mapped to define a stripe of data. One type of stripe, the parallel stripe, provides load balancing across the disks in the array by defining the stripe as parallel blocks of data across the disk array. It should be noted that parity refers to the evenness or oddness of the number of bits with value one within a given set of bits, and is thus determined by the value of all the bits. Parity can be calculated via an XOR sum of the bits, yielding 0 for even parity and 1 for odd parity. This property of being dependent upon all the bits and changing value if any one bit changes, allows for its use in error detection schemes. Parity data may be used by some RAID levels to achieve redundancy. If a drive in the array fails, remaining data on the other drives can be combined with the parity data (using the Boolean XOR function) to reconstruct the missing data.

Most RAID systems incorporate redundancy in some form of data interleaving, which distributes the data over all of the data disks in the array. Redundancy usually in the form of an error correcting code, with simple parity schemes predominating. However, RAID-1 uses a "mirroring" redundancy scheme in which duplicate copies of the same data are stored on two separate disks in the array. Parity and other error correcting codes are either stored on one or more disks dedicated for that purpose only, or distributed over all of the disks within an array. Data interleaving is usually in the form of data "striping" in which the data to be stored is broken down into blocks called "stripe units" which are then distributed across the data disk. A typically size of a stripe unit is 8K through 64K bytes. A "stripe" is a group of corresponding stripe units, one stripe unit from each disk in the array. The RAID stripe is made up of all the cache lines, which will be stored on the data disks plus the parity disk. A data stripe includes all of the cache lines, which are stored on the data disks, minus the parity disk. Parity computations are used in RAID drive arrays for fault tolerance by calculating, for example, the data in two drives and storing the results on a third. To compute parity, all of the cache lines, which make up a data stripe, may be XORed together. For example, the parity is computed by XOR'ing a bit from drive 1 with a bit from drive 2 and storing the result on drive 3. After a failed drive is replaced, the RAID controller rebuilds the lost data from the other two drives. A RAID system may have a "hot" spare drive ready and waiting to replace a drive that fails.

In the case of storage controllers for RAID storage systems, the application code is the RAID code, which is responsible for managing the data movement from the host interface to the disk storage. Thus, the "stripe size" may be equal to the size of a stripe unit times the number of data disks in the array. Data interleaving may also be accomplished on a bit-by-bit basis. Striping allows the RAID to offer the option of reading or writing to more than one disk at the same time in order to improve performance. In this arrangement, sequential data is broken into segments, which are sent to the various disks in the array, speeding up throughput. Also, because a RAID array uses multiple disks that appear to be a single device, it can often provide more storage capacity than a single disk.

For any particular stripe of data that goes across all the drives, at least one or more of those drives are parity drives. The parity drive used in the RAID array provides fault tolerance. When a large number of small write operations are being sent to a RAID array, there can be issues as multiple commands affect the same parity data. For example, if there are multiple updates going on within a parity stripe at the same time, the parity needs to be updated for all of those small updates. One way to handle such scenario, is to perform a lazy parity update, where if there is more than one operation that updates the parity at the same time, all the pieces of the parity is pulled together, and the parity is only written after all the updates within a particular stripe. Such operation is effective if the RAID algorithms are controlled by RAID code. For the small write operations, 1) the old data must be read for what is being updated, 2) the old parity that corresponds with what is being written must be read, 3) calculate the new parity, 4) write the new data, and 5) write the new parity. Thus, four operations (2 reads and 2 writes) are required for one write operation in RAID 5, and RAID 6 would turn into 6 operations since 2 parities must be read and written. (It should be noted that there are 5 steps, but only 4 operations go to the drives (e.g., drive operations). However, in more recent RAID controllers, such operations are controlled and performed all by hardware, rather than the RAID code. Once all the operations are performed by RAID hardware, lazy parity updates become inefficient because the hardware is doing all the operations by itself and are unaware of other operations occurring at the same time. So the parity updates end up becoming serialized, and/or, the RAID codes indicates that the RAID code has started an update that effects that part of the parity, but the RAID code needs to drop out of the performance path and start doing everything in the RAID code instead of the allowing the hardware optimization to handle the write operation and updates within a stripe.

When the large number of small write operations are being sent to a RAID array, there can be issues as the multiple commands affect the same parity data. For the RAID controller with hardware optimization, parity strip contention may cause the RAID controller to not be able to use the hardware optimization on the commands that have overlapping parity. Parity strip contention is when there are multiple operations that need to work with the same parity sectors at the same time. When the controller drops out of hardware optimization mode, the processor utilization in the RAID controller increases, which can lower the performance of all other operations, not just the ones that are run through the non-performance path. Also, in some RAID controllers, if the controller needs to drop out of the hardware optimization mode for a set of commands, then it needs to drop out of the hardware optimization mode for all commands until that set of commands has completed. For some workloads, the performance degradation can be significant.

To prevent the parity contention, the present invention delays the operation that have overlapping parity such that they are run serially instead of in parallel. This allows all of the operations to be done using the hardware optimization paths. Even though the individual commands are serialized, the overall performance is significantly better because the RAID controller is able to remain in the hardware optimization mode. In one embodiment, as a set of commands in a stripe is built, the present invention keeps/maintains a bitmap of which parity sectors of the parity stripe are affected by the commands. The parity bitmaps for each stripe, with commands being built, is monitored independent of the other stripes with commands being built. When one stripe is stopped for this reason, the present invention still allows the commands for other stripes to continue, as long as those stripes do not also have parity overlap.

If the parity for the commands needed in the next strip overlap with parity for commands that have already been sent in this particular stripe, then the commands for the remainder of the stripe are delayed until the currently running commands are complete. In other words, since at the host level above the RAID controller, the geometry of the RAID geometry is understood and the location of the parity for each of the write updates is known and/or may be determined, a determination is made as to which parity sectors are affected by each of the multiple write operations. If a new write operation (and/or a subsequent write) is going to affect/overlap the same parity stripe as a first write operation (e.g., a previous write operation), the new write operation is delayed from being sent to the RAID controller until the first write and/or previous write operation has completed. In this way, when the new and/or subsequent write is sent, the RAID controller is able to perform this subsequent write operation in the hardware optimization path.

In one embodiment, the bitmap of all of the parity sectors within the parity stripe, and each time a write operation is performed, a bit is set for the parity sector affected by the write operation. When the subsequent write operation is to be performed, a determination is made as to which parity sectors the subsequent write operation would affect. Then a determination is made to see if the bits of the affected parity sectors have been set. If the bits have already been set, then it is understood that one of the previous write operation are affecting that parity sectors, so the present invention then delays sending to the RAID controller the subsequent write operation until the previous write operation is complete. After the commands of the previous write operation are complete, the bits of that that parity sector may be cleared and the subsequent write operation is sent to the RAID controller. On the other hand, if the bits of the affected parity sector of the subsequent write operation have not been set, the subsequent write operation may be built and sent to the RAID controller at the same time as the previous write operation since the parity sector in the same parity stripe is not affect by the previous write operation. Both the previous write operation and the subsequent write operation are able to be handled (at the same time) by the hardware performance path.

Figure 1:
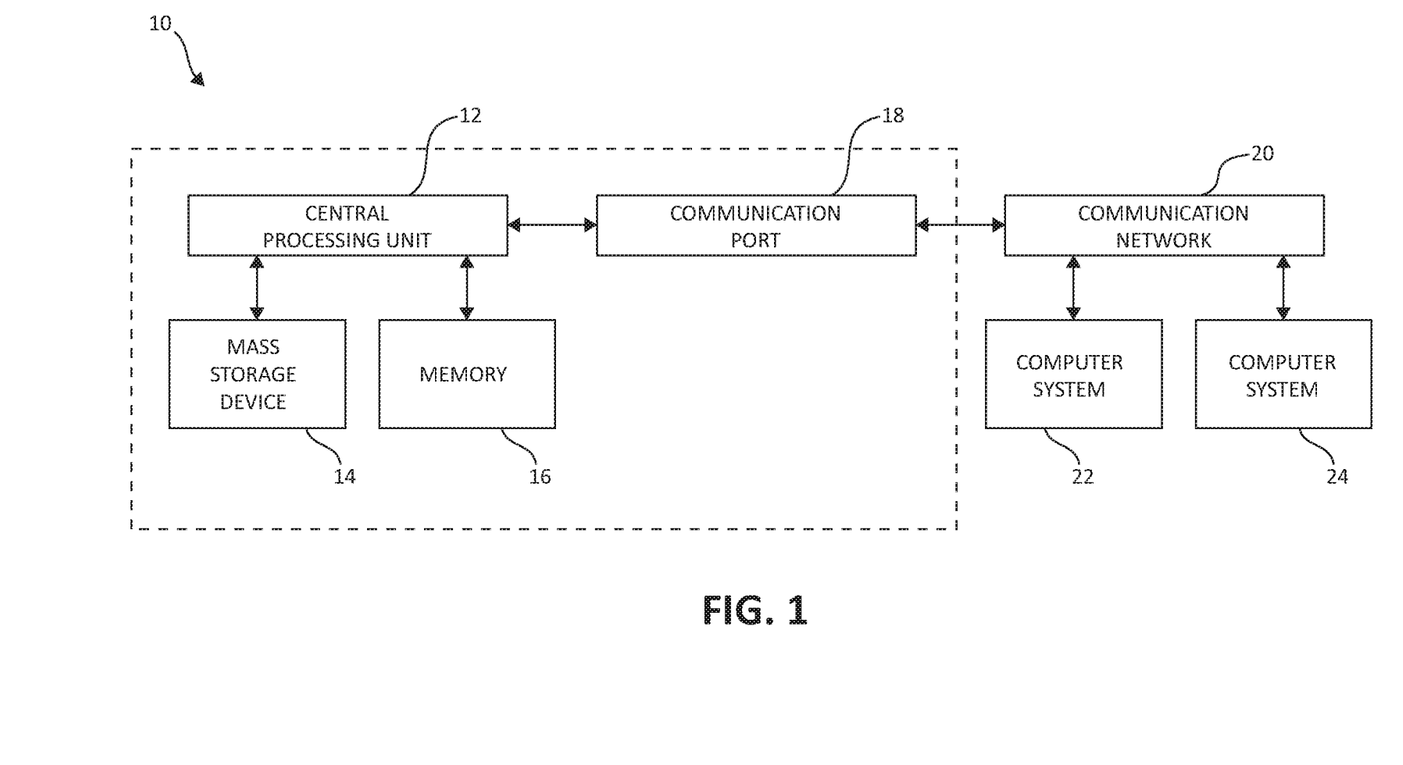
FIG. 1 is a block diagram illustrating a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
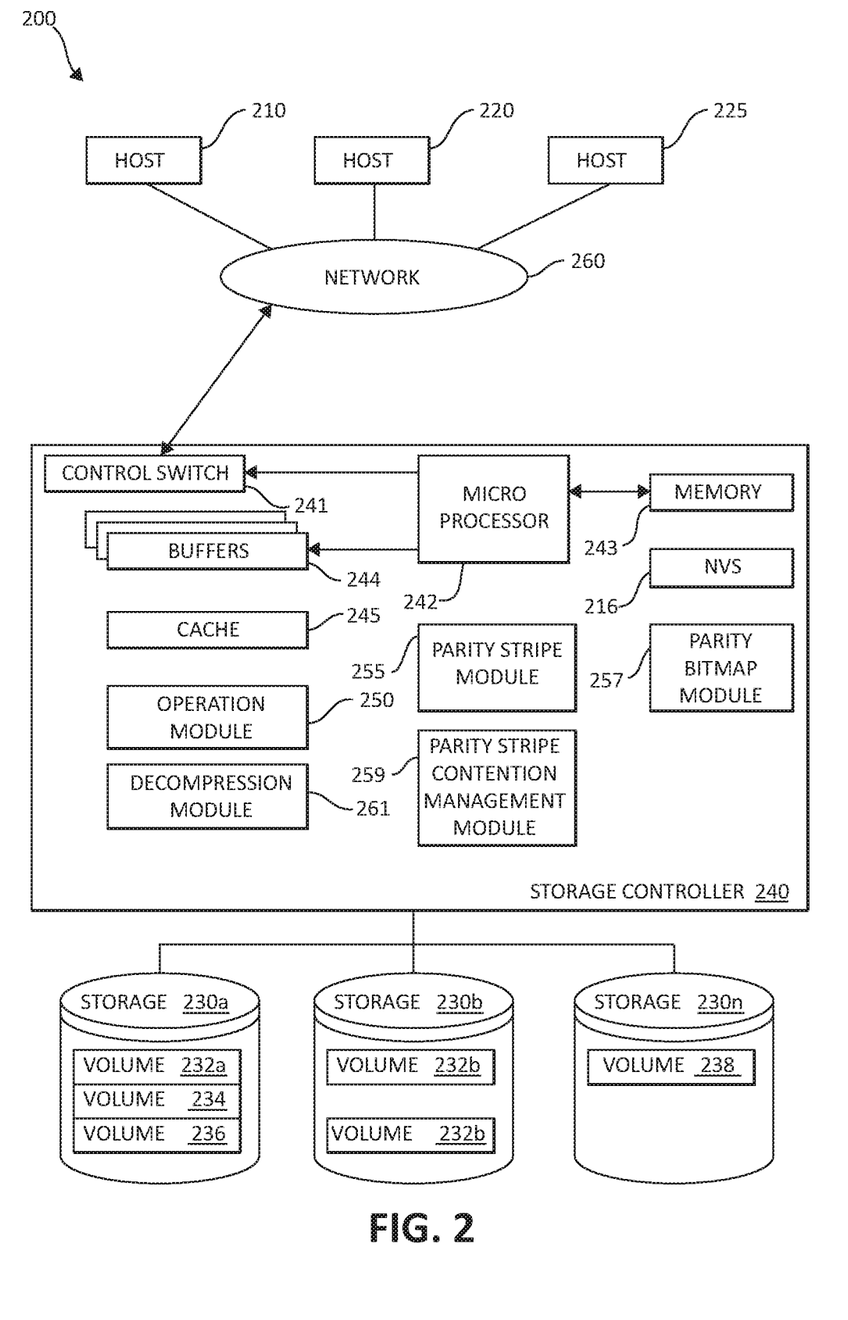
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a parity stripe module 255, a parity bitmap module 257, and a parity stripe contention management module 259. The parity stripe module 255, the parity bitmap module 257, and the parity stripe contention management module 259 may work in conjunction with each and every component of the storage controller 240, the hosts 210, 220, 225, and storage devices 230. The parity stripe module 255, the parity bitmap module 257, and the parity stripe contention management module 259 may be structurally one complete module or may be associated and/or included with other individual modules. The parity stripe module 255, the parity bitmap module 257, and the parity stripe contention management module 259, may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the parity stripe module 255, the parity bitmap module 257, and the parity stripe contention management module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the parity stripe module 255, the parity bitmap module 257, and the parity stripe contention management module 259 are in communication with each other and may be separate or one individual component (s). Also, several, if not all of the components, such as the operation software 250 may be included with the memory 243. Each of the components within the devices shown may be linked together and may be in communication with each other for purposes suited to the present invention.

As mentioned above, the parity stripe module 255, the parity bitmap module 257, and the parity stripe contention management module 259, may also be located in the cache 245 or other components. As such, one or more of the parity stripe module 255, the parity bitmap module 257, and the parity stripe contention management module 259, maybe used as needed, based upon the storage architecture and users preferences.

As described herein, the present invention provides a solution for managing RAID parity strip contention by stopping on strip boundaries above the RAID controller. In one embodiment, the present invention delays any operation that overlaps a parity sector in a parity strip of a currently running operation. The subsequent operations, which will overlap with the currently running operation in the parity sector of the parity strip, are serialized. As a set of commands in a parity sector of a parity stripe is built, a bitmap of which parity sectors are affected by the set of commands are maintained. If the parity for one of the commands needed in the next strip overlap with parity for at least one command that has already been sent in this parity sector of the parity strip, then the commands are delayed for the remainder of the stripe until the currently running commands are complete. In one embodiment, the present invention does not stop the remainder of the stripe, but rather, only delays the individual commands that have overlapping parity. The parity bitmap, with commands being built for each parity sector and parity stripe, is monitored independent of the other stripes with commands being built. When one stripe is stopped due to overlapping of write operations in a parity sector of the parity stripe, all other commands for other stripes are allowed to continue, as long as those stripes do not also have parity overlap.

Figure 3:
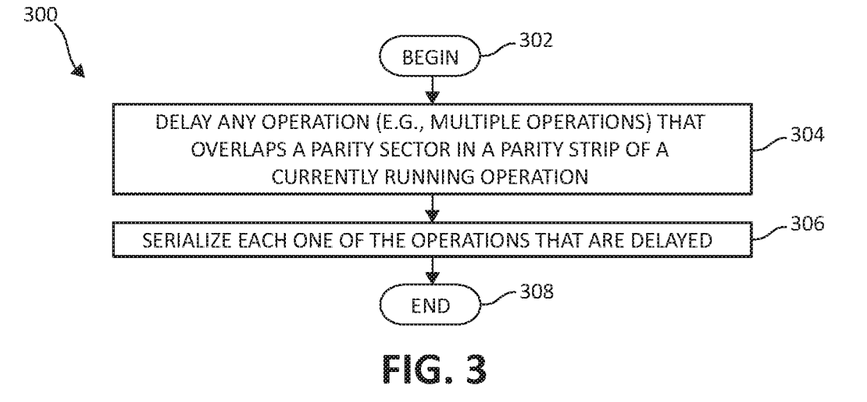
FIG. 3 is a flowchart illustrating an exemplary method for managing RAID parity strip contention in which aspects of the present invention may be realized.

FIG. 3 is a flowchart illustrating an exemplary method 300 for managing RAID parity strip contention in which aspects of the present invention may be realized. The method 300 begins (step 302) by delaying any operation (e.g., multiple operations) that overlaps a parity sector in a parity strip of a currently running operation (step 304). Each one of the operations are serialized (step 306). The method 300 ends (step 308).

Figure 4:
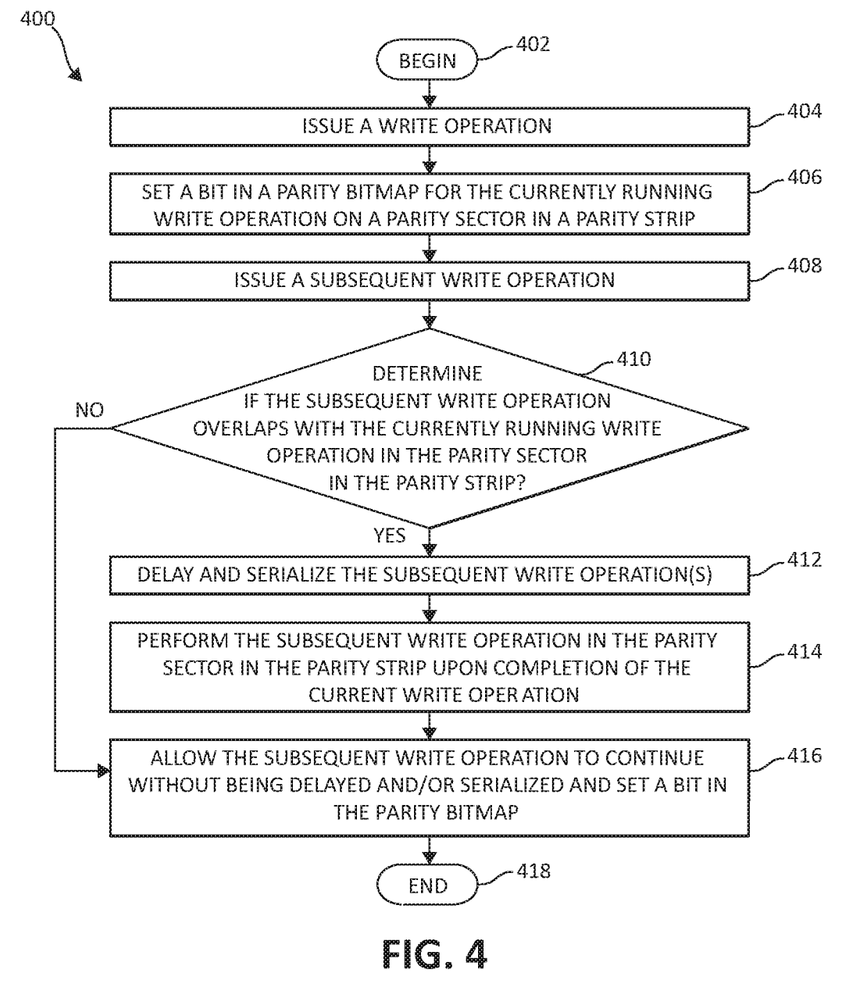
FIG. 4 is a flowchart illustrating an additional exemplary method for managing RAID parity strip contention in which aspects of the present invention may be realized.

FIG. 4 is a flowchart illustrating an additional exemplary method 400 for efficient handing of semi-asynchronous RAID write failures in which aspects of the present invention may be realized. The method 400 begins (step 402) by issuing a write operation (step 404). The write operation is performed by the RAID controller in the hardware optimization path. A bit is set in a parity bitmap for the currently running write operation on a parity sector in a parity strip (step 406). The method 400 issues a subsequent write operation (step 408). The method 400 determines if the subsequent write operation overlaps with the currently running write operation in the parity sector in the parity strip (step 410). In one embodiment, the parity bitmap is checked to determine if the bit is set. If the bit is set for the currently running write operation, the method determines the subsequent write operation will overlap with the currently running write operation. If the subsequent write operation overlaps with the currently running write operation in the parity sector in the parity strip, the method 400 delays and serializes the subsequent write operation (step 412). In other words, the subsequent write operation is delayed from being sent to the RAID controller until the first write and/or previous write operation has completed. In this way, when the new and/or subsequent write is sent, the RAID controller is able to perform this subsequent write operation in the hardware optimization path. The method 400 executes and performs the subsequent write operation in the parity sector in the parity strip upon completion of the current write operation (step 414).

If the subsequent write operation does not overlap with the currently running write operation in the parity sector in the parity strip, the method 400 allows the subsequent write operation to continue without being delayed and/or serialized and also sets a bit in the parity bitmap for this write (the subsequent write operation) so that another, subsequent write operation may determine if it overlaps as well. (step 416). In one embodiment, if the bit in the parity bitmap is not set in a parity sector of the parity stripe for the subsequent write operation, the method 400 determines the subsequent write operation will not overlap with the currently running write operation. The method 400 ends (step 418).

Figure 5:
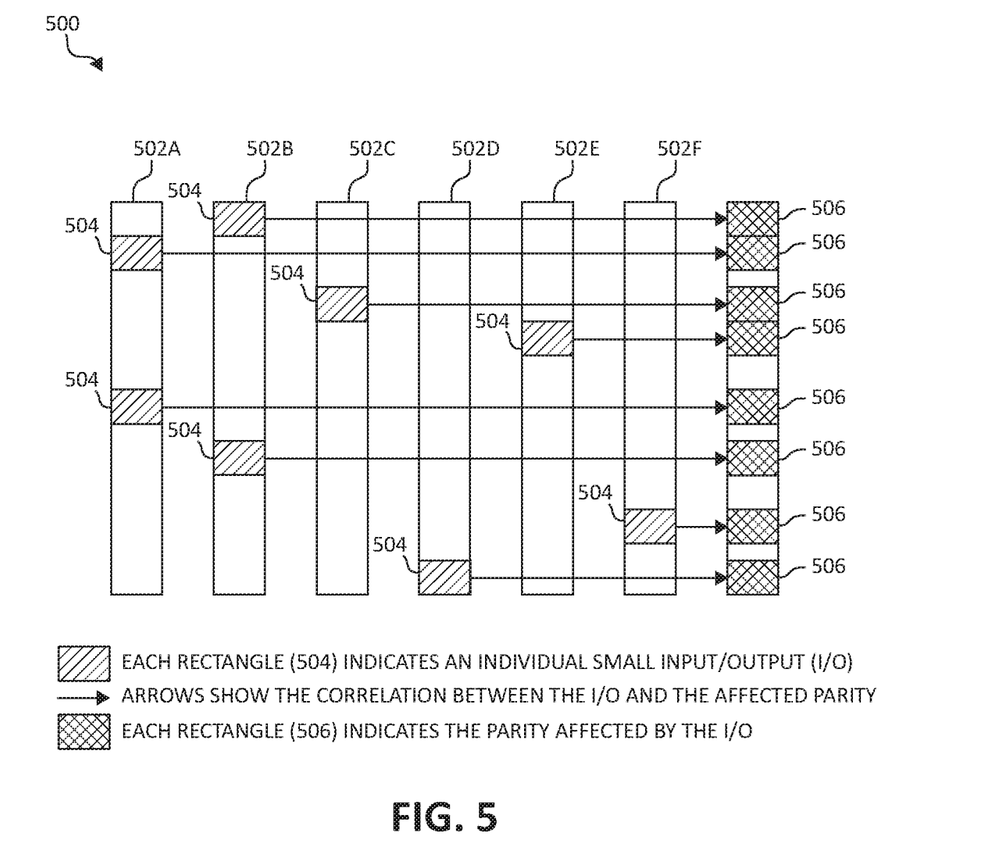
FIG. 5 is a block diagram illustrating a single parity stripe with multiple write operations with no parity contention/overlap in which aspects of the present invention may be realized.
Figure 6:
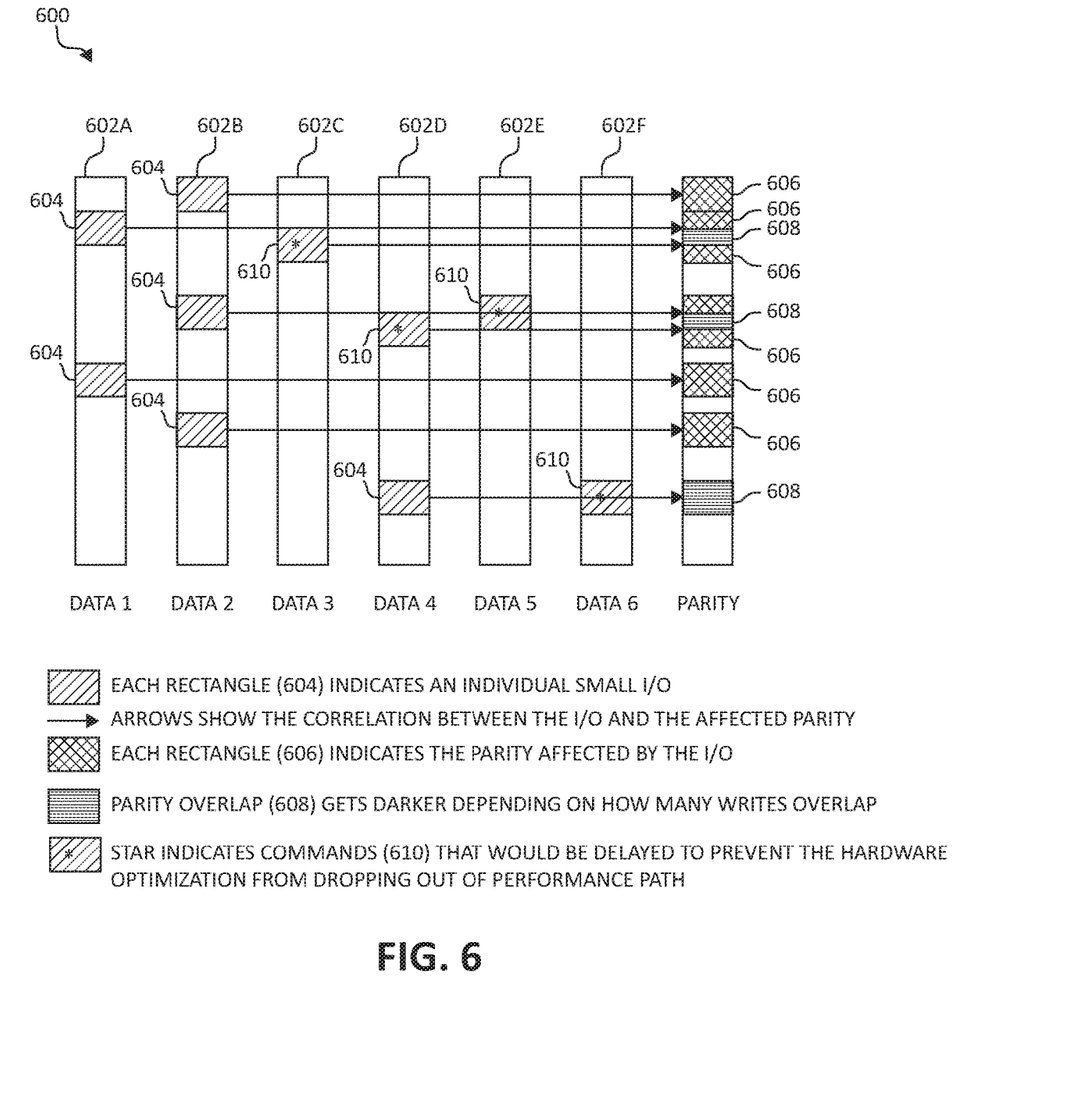
FIG. 6 is a block diagram illustrating a managing RAID parity strip contention in which aspects of the present invention may be realized.

FIG. 5 is a block diagram 500 illustrating a single parity stripe with multiple write operations with no parity contention/overlap in which aspects of the present invention may be realized. FIG. 5 shows that (input/output) I/Os that do not overlap and therefore may be done with no delays. FIG. 5 illustrates a RAID environment with multiple data segments 502 (e.g., data illustrated in FIG. 5 as data 1 502A, data 2 502B, data 3 502C, data 4 502D, data 5 502E, and data 6 502F. A single parity stripes 500 with multiple small writes 502 with no parity contention/overlap in a 6+P RAID-5 Array (which may be other RAID type/size) by way of example only. In FIG. 5, an individual small I/O is indicated as 504 the parity affected by the individual small I/O 504 are shown as 506. The arrows show the correlation between the I/O 504 and the affected parity 506. I/O, which does not affect the same parity sectors, may be done in parallel without performance degradation. Thus, as illustrated in FIG. 5, there is no overlap and the present invention would allow all of the I/O to flow with no delays. FIG. 6, below, illustrates overlapping I/O.

FIG. 6 is a block diagram 600 illustrating a managing RAID parity strip contention in which aspects of the present invention may be realized. FIG. 6 illustrates a RAID environment with multiple data segments 602 (e.g., data illustrated in FIG. 6 as data 1 602A, data 2 602B, data 3 602C, data 4 602D, data 5 602E, and data 6 602F. A single parity stripes 600 with multiple small writes 604 with parity contention/overlap in a 6+P RAID-5 Array (which may be other RAID type/size) by way of example only. In FIG. 6, an individual small I/O is indicated as 604 and the parity (606) affected by the individual small I/O 604 are shown as 606. The parity overlaps 608 are illustrated depending on how many writes overlap. The commands 610 depicted using an "*" are the commands that would be delayed to prevent the hardware optimization from dropping out of a performance path. The arrows show the correlation between the I/O 604 and the affected parity 606. I/O, which affects the same parity sectors, may not be done in parallel without performance degradation. However, by using the embodiments described herein, the second (and subsequent) write operations, which affect the same parity sectors, are delayed until the prior (first) write operation is complete.

Using FIG. 6, the present invention may handle the parity overlaps using at least two different implementations. A first description, implementation, and/or process delays all remaining I/O in a stripe each time an overlap is detected, which may be predominant way to currently write the write operation. The first description, implementation, and/or process delays all remaining I/O in the stripe every time an overlap is found. A second description, implementation, and/or process delays only the I/O that actually overlaps, but allows further I/O in the stripe that does not overlap. The second description, implementation, and/or process delays only the I/O that overlaps prior I/O. In one embodiment, depending on the pattern of the incoming writes, one of the implementations, as described herein, may be more efficient and advantageous to use. In one embodiment, user preferences and/or analysis of the pattern of incoming writes may decide which of the embodiments described herein to use.

For the first description, implementation, and/or process, assuming that the invention delays 610 all remaining I/O in the stripe each time an overlap is found, the following steps are performed. 1) Check the I/Os in Data 1 602A to determine if there is an overlap with a prior I/O. In FIG. 6, there is no prior I/O therefore there is no overlap found. 2) Update a parity bitmap indicating which parity sectors are affected by the I/O in Data 1 602A. 3) Issue write operations for the I/O in Data 1 602A. 4) Check the I/Os in Data 2 602B to determine if there is an overlap with a prior I/O. Again, there is no parity overlap in Data 2 602B. All I/O in Data 2 602B affects different parity sectors than the prior I/O. 5) Update the parity bitmap indicating which parity sectors are affected by the I/O in Data 2 602B. 6) Issue write operations for the I/O in Data 1 602B. 7) Check the I/Os in Data 3 602C to determine if there is an overlap with a prior I/O. In this case, there is only 1 I/O in Data 3 602C, and the I/O overlaps 608 (e.g., parity overlap) with one of the I/Os in Data 1 602A. Because parity overlap 608 was detected, the present invention delays 610 any further I/O in this stripe until the prior I/O is complete. 8) The I/O completes. As each I/O completes, the corresponding parity bits are cleared. Because all I/Os are complete, all parity bits are now clear. 9) Check the I/Os in Data 3 602C to determine if there is an overlap with a prior I/O. Again, there is no prior I/O (because it has now all completed), therefore there is no overlap found. 10) Update the parity bitmap indicating which parity sectors are affected by the I/O in Data 3 602C. 11) Issue write operations for the I/O in Data 3 602. 12) Check the I/Os in Data 4 602D to determine if there is an overlap with a prior I/O. In this case, there is no overlap. All the I/Os in Data 4 602D affect different parity sectors than the prior I/O that has not completed. 13) Update the parity bitmap indicating which parity sectors are affected by the I/O in Data 4 602D. 14) Issue write operations for the I/O in Data 4 602D. 15) Check the I/Os in Data 5 602E to determine if there is an overlap with a prior I/O. In this case, there is only 1 I/O in Data 5 602E, and it overlaps 608 with one of the I/Os in Data 4 602D. Because parity overlap 608 was detected, the present invention delays 610 any further I/Os in this stripe until the prior I/O is complete. 16) The I/O completes. As each I/O completes, the corresponding parity bits are cleared. Because all I/Os are complete, all parity bits are now clear. 17) Check the I/Os in Data 5 602E to determine if there is an overlap with prior I/O. In this case, there is no prior I/O (because the prior I/Os have now all completed), therefore there is no overlap found. 18) Update the parity bitmap indicating which parity sectors are affected by the I/O in Data 5 602E. 18) Issue write operations for the I/O in Data 5 602E. 19) Check the I/Os in Data 6 602F to determine if there is an overlap with a prior I/O. In this case, there is no parity overlap. All I/O in Data 6 602E affects different parity sectors than the prior I/O that has not completed. 20) Update the parity bitmap indicating which parity sectors are affected by the I/O in Data 6 602E. 21) Issue write operations for I/O in Data 6 602E. 22) The I/O completes. As each I/O completes, the corresponding parity bits are cleared. Because all I/Os are complete, all parity bits are now clear. Thus, as illustrated above, using these operations requires two delay points to handle the four 610 writes with overlapping parity.

For the second description, implementation, and/or process, assuming that the present invention stops only the I/Os that are overlapped, and allows other I/O in the strips to continue, the following steps are performed. 1) Check the I/Os in Data 1 602A to determine if there is an overlap with a prior I/O. In FIG. 6, there is no prior I/O therefore there is no parity overlap found. 2) Update a parity bitmap indicating which parity sectors are affected by the I/O in Data 1 602A. 3) Issue write operations for the I/O in Data 1 602A. 4) Check the I/Os in Data 2 602B to determine if there is an overlap with a prior I/O. Again, there is no parity overlap in Data 2 602B. All I/O in Data 2 602B affects different parity sectors other than the prior I/O. 5) Update the parity bitmap indicating which parity sectors are affected by the I/O in Data 2 602B. 6) Issue write operations for the I/O in Data 1 602B. 7) Check the I/Os in Data 3 602C to determine if there is an overlap with a prior I/O. In this case, there is only 1 I/O in Data 3 602C, and the I/O overlaps 608 (e.g., parity overlap) with the first I/O in Data 1 602A. Because parity overlap 608 was detected, the present invention delays 610 the first, and only the first, I/O in Data 3 602C. 8) Checks the I/Os in Data 4 602D to see if overlap with prior I/O. The first I/O in Data 4 602D overlaps with the second I/O in Data 2 602B. The second I/O in Data 4 602D does not overlap with prior I/O. 9) Because the parity overlap was detected, the first I/O in Data 4 602D is delayed 610. 10) Because no parity overlap was detected, the second I/O in Data 4 602D is allowed to continue. 11) Update the parity bitmap indicating which parity sectors are affected by the second I/O in Data 4 602D. 12) Issue write operations for the second I/O in Data 4 602D. 13) Check the I/Os in Data 5 602E to determine if there is an overlap with prior I/O. There is only one I/O in Data 5 602E, and the I/O overlaps 608 with the second I/O in Data 2 602E. 14) Because parity overlap was detected, the first, and only the first, I/O is delayed 610 in Data 5 602E. 15) Check the I/Os in Data 6 602F to determine if there is an overlap with prior I/O. There is only one I/O in Data 6 602F, and the I/O overlaps with the second I/O in Data 4 602D. 16) Because parity overlap was detected, the first, and only first, I/O is delayed 610 in Data 6 602F. At this point, four I/Os have been delayed 610: a) the first I/O in Data 3 602C, b) the first I/O in Data 4 602D, c) the first I/O in Data 5 602E, and the first I/O in Data 6 602F. 17) The I/O completes. As each I/O completes, the corresponding parity bits are cleared. Because all I/O's are complete, all parity bits are now clear. 18) Check the first I/O in Data 3 to see if overlap with prior I/O. There is no prior I/O (because it has now all completed), therefor there is no overlap found. 19) Update the parity bitmap indicating which parity sectors are affected by the first I/O in Data 3 602C. 20) Issue write operations for the first I/O in Data 3 602C. 21) Check the first I/O in Data 4 602D to determine if there is an overlap with a prior I/O. In this case, there is no overlap. The first I/O in Data 4 602D affects different parity sectors than the prior I/O that has not completed. 22) Update the parity bitmap indicating which parity sectors are affected by the first I/O in Data 4 602D. Issue write operations for the first I/O in Data 4 602D. Check the first I/O in Data 5 602E to determine if there is an overlap with a prior I/O. The first I/O in Data 5 602E overlaps with the first I/O in Data 4 602D. 23) Because parity overlap was detected, the first I/O in Data 5 602E is delayed again. 24) Check the first I/O in Data 6 602F to see if overlap with prior I/O. There is no overlap. The first I/O in Data 6 affects different parity sectors than the prior I/O that has not completed. 25) Update the parity bitmap indicating which parity sectors are affected by the first I/O in Data 6 602F. 26) Issue write operations for the first I/O in Data 6 602F. At this point one I/O (the first I/O in Data 5 (602E) is still delayed. 27) The I/O completes. As each I/O completes, the corresponding parity bits are cleared. Because all I/O's are complete, all parity bits are now clear. 28) Check the first I/O in Data 5 602E to see if overlap with a prior I/O. There is no prior I/O (because it has now all completed), therefore there is no overlap found. 29) Update the parity bitmap indicating which parity sectors are affected by the first I/O in Data 5 602E. Issue write operations for the first I/O in Data 5 602E. The I/O completes. As each I/O completes, the corresponding parity bits are cleared. Because all I/O is complete, all parity bits are now clear. Thus, as illustrated above, using these operations requires three delay points to handle the four 610 writes with overlapping parity.

In one embodiment, for managing RAID parity stripe contention using a processor device in a computing environment, the present invention delays at least one of a multiplicity of operations (e.g., write operations in hardware performance path) overlapping a parity sector in a parity stripe with a currently running operation and serializing each one of the multiplicity of operations overlapping the parity sector. In one embodiment, the present invention using a hard performance path for each one of the plurality of operations by a RAID controller.

In one embodiment, the present invention determines if each one of the multiplicity of operations overlaps with the currently running operation in the parity sector in the parity stripe.

In one embodiment, the present invention allows those of the multiplicity of operations, which are not overlapping with the currently running operation in the parity sector in the parity stripe, to continue on a hardware performance path without being delayed.

In one embodiment, the present invention maintains a parity bitmap indicating those of a multiplicity of parity sectors in a multiplicity of parity stripes are affected by the multiplicity of operations.

In one embodiment, the present invention sets a bit in the parity bitmap for the parity sector in the parity stripe for the currently running operation. In one embodiment, the present invention clears the bit in the parity bitmap for the parity sector in the parity stripe upon completion of the currently running operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing RAID parity stripe contention using a processor device in a computing environment, the method comprising:
   delaying, by a host being separate to the RAID, one of a plurality of operations sent to a RAID controller having an overlapping of a parity sector in a parity stripe with a currently running operation and serializing, by the host, each one of the plurality of operations overlapping the parity sector; wherein the delaying further includes the host determining whether a new write written through a hardware performance path comprising the one of the plurality of operations will overlap the parity stripe of a previous write comprising the currently running operation at the RAID controller, and wherein the hardware performance path comprises a hardware optimization mode for handling write operations and updates controlled by the RAID controller.

2. The method of claim 1, further including using the hard performance path for each one of the plurality of operations by the RAID controller.

3. The method of claim 1, further including determining if each one of the plurality of operations overlaps with the currently running operation in the parity sector in the parity stripe.

4. The method of claim 1, further including allowing those of the plurality of operations, which are not overlapping with the currently running operation in the parity sector in the parity stripe, to continue on the hardware performance path without being delayed.

5. The method of claim 1, further including maintaining a parity bitmap indicating those of a plurality of parity sectors in a plurality of parity stripes are affected by the plurality of operations.

6. The method of claim 5, further including setting a bit in the parity bitmap for the parity sector in the parity stripe for the currently running operation.

7. The method of claim 6, further including clearing the bit in the parity bitmap for the parity sector in the parity stripe upon completion of the currently running operation.

8. A system for managing RAID parity stripe contention in a computing environment, the system comprising:
   a RAID controller; and
   at least one processor device in communication with the RAID controller and operable in the computing environment, wherein the at least one processor device:
      delays, by a host being separate to the RAID, one of a plurality of operations sent to the RAID controller having an overlapping of a parity sector in a parity stripe with a currently running operation and serializes, by the host, each one of the plurality of operations overlapping the parity sector; wherein the delaying further includes the host determining whether a new write written through a hardware performance path comprising the one of the plurality of operations will overlap the parity stripe of a previous write comprising the currently running operation at the RAID controller, and wherein the hardware performance path comprises a hardware optimization mode for handling write operations and updates controlled by the RAID controller.

9. The system of claim 8, wherein the at least one processor device uses a hard performance path for each one of the plurality of operations by the RAID controller.

10. The system of claim 8, wherein the at least one processor device determines if each one of the plurality of operations overlaps with the currently running operation in the parity sector in the parity stripe.

11. The system of claim 8, wherein the at least one processor device allows those of the plurality of operations, which are not overlapping with the currently running operation in the parity sector in the parity stripe, to continue on a hardware performance path without being delayed.

12. The system of claim 8, wherein the at least one processor device maintains a parity bitmap indicating those of a plurality of parity sectors in a plurality of parity stripes are affected by the plurality of operations.

13. The system of claim 8, wherein the at least one processor device sets a bit in the parity bitmap for the parity sector in the parity stripe for the currently running operation.

14. The system of claim 13, wherein the at least one processor device clears the bit in the parity bitmap for the parity sector in the parity stripe upon completion of the currently running operation.

15. A computer program product for managing RAID parity stripe contention using a processor device, the computer program product comprising a non-transitory computer-readable storage medium having computer-readable program code portions stored therein, the computer-readable program code portions comprising:
   an executable portion that delays, by a host being separate to the RAID, one of a plurality of operations sent to a RAID controller having an overlapping of a parity sector in a parity stripe with a currently running operation and serializes, by the host, each one of the plurality of operations overlapping the parity sector; wherein the delaying further includes the host determining whether a new write written through a hardware performance path comprising the one of the plurality of operations will overlap the parity stripe of a previous write comprising the currently running operation at the RAID controller, and wherein the hardware performance path comprises a hardware optimization mode for handling write operations and updates controlled by the RAID controller.

16. The computer program product of claim 15, further including an executable portion that uses a hard performance path for each one of the plurality of operations by the RAID controller.

17. The computer program product of claim 15, further including an executable portion that determines if each one of the plurality of operations overlaps with the currently running operation in the parity sector in the parity stripe.

18. The computer program product of claim 15, further including an executable portion that allows those of the plurality of operations, which are not overlapping with the currently running operation in the parity sector in the parity stripe, to continue on a hardware performance path without being delayed.

19. The computer program product of claim 15, further including an executable portion that maintains a parity bitmap indicating those of a plurality of parity sectors in a plurality of parity stripes are affected by the plurality of operations.

20. The computer program product of claim 15, further including an executable portion that performs each one of:
   setting a bit in the parity bitmap for the parity sector in the parity stripe for the currently running operation, and
   clearing the bit in the parity bitmap for the parity sector in the parity stripe upon completion of the currently running operation.

* * * * *